United States Patent
Papin

(10) Patent No.: US 11,794,400 B2
(45) Date of Patent: Oct. 24, 2023

(54) METHOD FOR MANUFACTURING A COMPOSITE PRESSURIZED-FLUID VESSEL

(71) Applicant: L'Air Liquide Société Anonyme pour l'Etude et l'Exploitation des Procédés Georges Claude, Paris (FR)

(72) Inventor: Philippe Papin, Bievres (FR)

(73) Assignee: L'Air Liquide, Société, Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 17/778,595

(22) PCT Filed: Nov. 2, 2020

(86) PCT No.: PCT/EP2020/080624
§ 371 (c)(1),
(2) Date: May 20, 2022

(87) PCT Pub. No.: WO2021/099094
PCT Pub. Date: May 27, 2021

(65) Prior Publication Data
US 2023/0001628 A1     Jan. 5, 2023

(30) Foreign Application Priority Data

Nov. 20, 2019 (FR) ...................................... 1912927

(51) Int. Cl.
| | |
|---|---|
| *B29C 53/84* | (2006.01) |
| *B29C 53/56* | (2006.01) |
| *B29K 101/12* | (2006.01) |
| *B29K 307/04* | (2006.01) |
| *B29K 309/08* | (2006.01) |
| *B29L 31/00* | (2006.01) |

(52) U.S. Cl.
CPC .......... *B29C 53/564* (2013.01); *B29C 53/845* (2013.01); *B29K 2101/12* (2013.01); *B29K 2307/04* (2013.01); *B29K 2309/08* (2013.01); *B29K 2713/005* (2013.01); *B29K 2995/0063* (2013.01); *B29K 2995/0097* (2013.01); *B29L 2031/7156* (2013.01)

(58) Field of Classification Search
CPC ............................ B29C 53/845; B29C 53/564
See application file for complete search history.

(56) References Cited

U.S. PATENT DOCUMENTS

| | | | |
|---|---|---|---|
| 6,171,423 B1 * | 1/2001 | Murphy ................ | B29C 70/446 156/244.14 |
| 6,190,598 B1 * | 2/2001 | Murphy ................ | B29C 70/342 264/533 |
| 6,565,793 B1 * | 5/2003 | Goldsworthy ........ | B29C 53/582 264/516 |
| 7,354,495 B2 * | 4/2008 | Carter ................... | F17C 13/025 156/169 |

FOREIGN PATENT DOCUMENTS

| | | |
|---|---|---|
| FR | 3 037 633 | 12/2016 |
| FR | 3 076 594 | 7/2019 |

OTHER PUBLICATIONS

International Search Report and Written Opinion for corresponding PCT/EP2020/080624, dated Jan. 28, 2021.

* cited by examiner

*Primary Examiner* — Jeffry H Aftergut
(74) *Attorney, Agent, or Firm* — Elwood L. Haynes

(57) ABSTRACT

A method for manufacturing a composite pressurized-fluid vessel including winding a first polyolefin resin-based tape thereby forming a first layer of the vessel, depositing an intermediate second layer on the first layer, consisting of a material having variable permeability properties depending on the temperature and permeability below a pre-determined temperature threshold and non-permeability above the temperature threshold, winding a second resin-based tape on the intermediate second layer thereby forming a third layer, and cooling the intermediate second layer to a temperature below the temperature threshold while the first and third layers are each kept at a temperature above the melting temperature of their resin. Wherein the tape forming the third layer is based on a different resin from the first layer and during the step of depositing the intermediate second layer.

11 Claims, 1 Drawing Sheet

[Fig. 1]
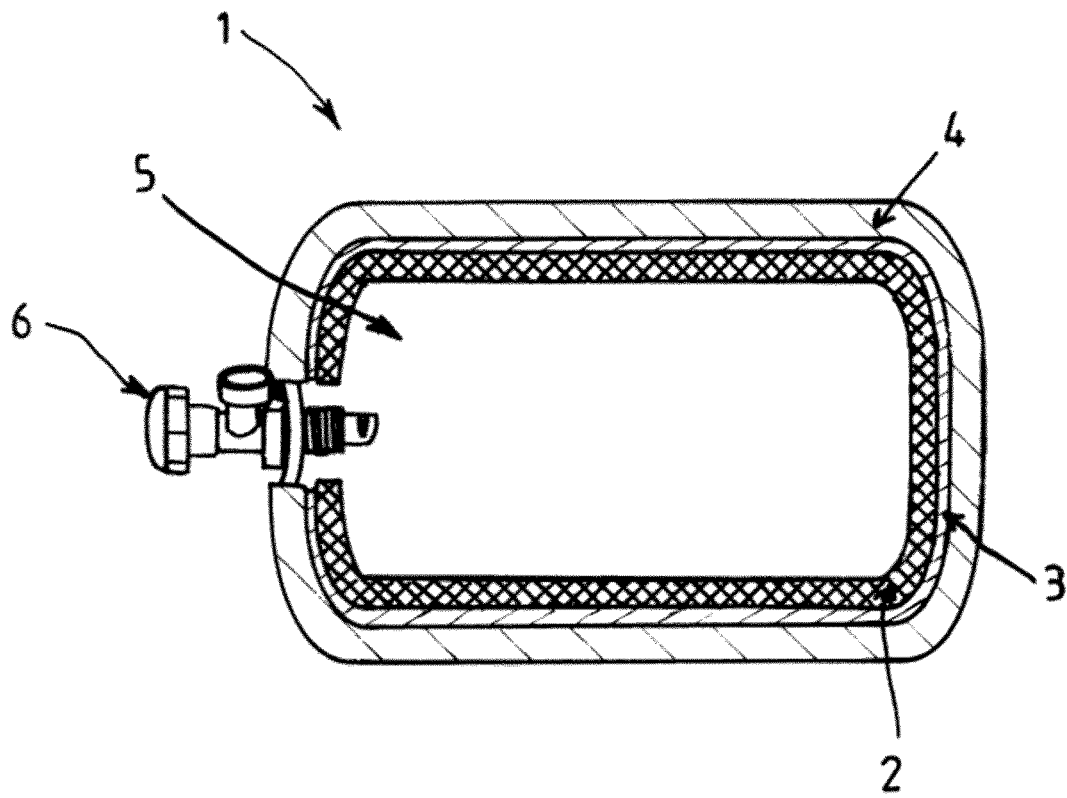
[Fig. 2]
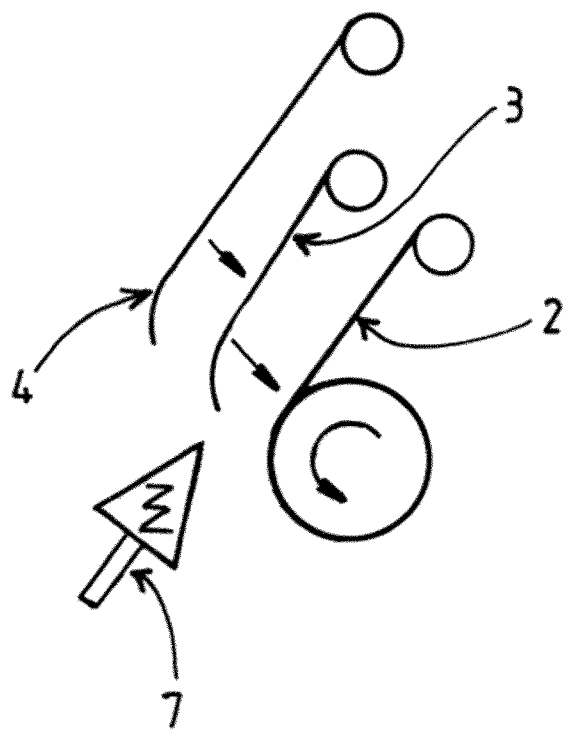

METHOD FOR MANUFACTURING A COMPOSITE PRESSURIZED-FLUID VESSEL

CROSS REFERENCE TO RELATED APPLICATIONS

This application is a 371 of International Application No. PCT/EP2020/080624, filed Nov. 2, 2020, which claims priority to French Patent Application No. 1912927, filed Nov. 20, 2019, the entire contents of which are incorporated herein by reference.

BACKGROUND

The invention relates to a method for manufacturing a composite pressurized-fluid vessel.

The invention relates more particularly to a method for manufacturing a composite pressurized-fluid vessel comprising a step of winding a first polyolefin resin-based tape in order to form a first layer of the vessel, a step of depositing an intermediate second layer on the first layer, consisting of a material having variable permeability properties depending on the temperature, and in particular permeability below a pre-determined temperature threshold and non-permeability above the temperature threshold, the method comprising a step of winding a second resin-based tape on the intermediate second layer in order to form a third layer.

The invention relates to thermoplastic composite vessels manufactured using tapes reinforced with polyolefin resins. In some applications, various elements such as, for example, supports or accessories, must be attached to the outer surface of the vessel.

Polyolefin resins such as, for example, polybutene-1, polyethylene and polypropylene, are poorly suited to forming a bond with an additional layer during the manufacturing of the vessel.

Polyolefin resins have a fairly stable chemical structure (very stable outer electron structure). As a result, it is fairly difficult to form a chemical bond (structural bond) to bond this resin to another layer or material.

Techniques exist to overcome this problem. In order to improve the ability of such a resin to form a bond with another layer or material, it is known practice for example to provide for a chemical attack on the surface of the material, a plasma treatment (for example "Matis" treatment), a flame treatment, or surface abrasion. The aim of these solutions is to change the chemistry of the surface layer to allow a chemical bond with an adhesive.

Some adhesives give very good adhesion results on polyolefin resins but have a very short open time (cyanoacrylate adhesives such as 3M DP 8005 in particular). These adhesives can also cause health problems.

Other adhesives must be applied according to a very specific, complex protocol in order to produce the greatest strength of the bond. This makes the bond quality dependent on the operator (temperature for applying the adhesive, precise ratio for the components of the adhesive, moisture level, adhesive thickness, etc.).

These known solutions do not however give the required result over time. A deterioration in the bond quality can be observed over time.

Despite these problems, said polyolefin resins are often the most widely used resins for manufacturing composite vessels, due in particular to their advantageous cost.

SUMMARY

One aim of the present invention is to overcome all or some of the drawbacks of the prior art set out above.

To this end, the method according to the invention, which also meets the generic definition given in the preamble above, is essentially characterized in that the tape forming the third layer is based on a different resin from the first layer, and in that, during the step of depositing the intermediate second layer and during the step of winding the second tape, the intermediate second layer is kept at a temperature above the threshold temperature, the method then comprising a step of cooling the intermediate second layer to a temperature below the threshold temperature while the first and third layers are each kept at a temperature above the melting temperature of their resin.

Furthermore, embodiments of the invention can include one or more of the following features:
- the first polyolefin resin-based tape contains reinforcing fibers such as glass and/or carbon fibers,
- the second layer has a thickness smaller than the thickness of the first layer,
- the tape forming the third layer is based on a thermoplastic resin,
- the tape forming the third layer is based on a resin comprising at least one of the following materials: PET, PBT, PA, polymer and copolymer,
- the melting temperatures of the resins of the first and third layers are within a 40° C. temperature range,
- the melting temperature of the resin of the third layer is above the melting temperature of the first layer,
- the intermediate second layer comprises or consists of a fleece,
- the intermediate second layer consists of at least one of the following materials: polyester, polyamide or a combination thereof,
- the intermediate second layer consists of a material having a weight per unit area of between 50 and 800 grammes per $m^2$,
- the first layer of the vessel forms the sealed liner intended to be in contact with the fluid to be stored in the vessel or is situated on the outer surface of a sealed liner intended to be in contact with the fluid to be stored in the vessel.

The invention can also relate to any alternative device (vessel) or method comprising any combination of the features above or below within the scope of the claims.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein:

FIG. 1 shows a schematic, partial view in cross-section illustrating an example of the structure of a vessel according to the invention, FIG. 2 shows a schematic, partial view illustrating an example of steps of the manufacturing method according to the invention.

DETAILED DESCRIPTION OF PREFERRED EMBODIMENTS

The method for manufacturing a composite pressurized-fluid vessel comprises a step of winding a first polyolefin resin-based tape in order to form a first layer 2 of the vessel.

As illustrated in FIG. 1, this first layer 2 can form the sealed liner intended to be in contact with the fluid to be stored in the reservoir. Of course, this first layer 2 can be wrapped on the outer surface of a sealed liner and intended to be in contact with the fluid to be stored in the vessel (storage volume 5). This pre-formed sealed liner can be made from plastic or metal, for example. That is, the final vessel can be a type III, IV or V vessel, for example. As illustrated, the vessel can be provided with a base in which a valve 6 is mounted.

The first tape can be configured to form a layer ensuring the mechanical strength of the vessel under internal pressure.

The method then comprises a step of depositing an intermediate second layer 3 on the first layer 2, consisting of a material having variable permeability properties depending on the temperature, and in particular permeability below a pre-determined temperature threshold and non-permeability above the temperature threshold. These permeable/impermeable states are preferably reversible.

For example, this intermediate second layer 3 comprises or consists of a breather or fleece. The intermediate second layer 3 can in particular consist of at least one of the following materials: polyester, polyamide or a combination thereof. The intermediate second layer 3 can have a weight per unit area of between 50 and 800 grammes per m$^2$.

This second layer is for example deposited on the first layer by manual application, preferably avoiding the formation of folds.

The method also comprises a step of winding a second resin-based tape on the intermediate second layer 3 in order to form a third layer 4. The tape forming the third layer 4 is based on a different resin from the first layer 2. The tape forming the third layer 4 is for example based on a thermoplastic resin, in particular comprising at least one of the following materials: PET, PBT, PA, polymer and copolymer.

During the step of depositing the intermediate second layer 3 and during the step of winding the second tape, the intermediate second layer 3 is kept at a temperature above the temperature threshold (that is, in a non-permeable state, and in particular non-permeable to resins). The two resin-based layers 2, 4 are heated or kept above their melting temperature (for example via a heating member 7).

The method then comprises a step of cooling the intermediate second layer 3 to a temperature below the temperature threshold (that is, in a state in which it is permeable to resins), but above the melting temperatures of the resins of the first 2 and third 4 layers.

This makes it possible to achieve mechanical cohesion between first 2 and third 4 layers in the second layer 3. The two resins in question migrate into the permeable or porous structure of the intermediate second layer 3. On the subsequent cooling of the assembly, the solidification ensures cohesion and sealing between all of the layers due to the intermediate second layer 3.

The two wrapped tapes ultimately behave structurally as a single entity or wall.

The resin of the third layer 4 preferably has a melting temperature close to that of the polyolefin resin used for the first layer 2. This makes it possible to achieve a hermetic and structurally bonded structure of the composite vessel.

For example, the melting temperature of the resin of the tape forming the third layer 4 preferably differs by zero to forty degrees from the melting temperature of the resin of the layer forming the first layer 2 (polyolefin resin). The melting temperature of the resin of the tape forming the third layer 4 is preferably above the melting temperature of the resin of the layer forming the first layer 2 (polyolefin resin).

The intermediate second layer 3 thus allows a bond between the two different tapes formed from different resins (and which can have reinforcing fibers, preferably the same reinforcing fibers).

The resin of the second tape (which will be on the outer surface of the vessel, where appropriate) can be a thermoplastic resin such as PET, PBT, PA, copolymers and polymers. It will thus be easier for this outer layer to be suitable for being bonded (glued) to other layers or accessories than a polyolefin-resin based layer.

The second layer 4 has a thickness smaller than the thickness of the first layer 2.

For example, the thickness of the second layer 4 can be between 0.3 and 1.5 mm. This thickness can be uniform over the surface of the vessel or can vary over the surface of the vessel.

Thus, in a possible example, the method can proceed as follows:
  winding the first tape in order to form the first layer 2,
  applying the intermediate second layer 3 at a temperature above the temperature threshold,
  winding the second tape in order to form the third layer 4,
  cooling to below the temperature threshold.

When the winding of the second tape is complete, the assembly can be cooled so that the material of the intermediate second layer 3 regains its permeable properties. The resins of the other two layers 2, 4 are still above their melting temperature and can thus migrate into the permeable intermediate second layer. This creates an entity with a very high bond strength, which prevents separation unless the wall of the vessel is completely damaged.

The third layer 4 can thus consist of resin that can be bonded more effectively with adhesives on its outer surface.

This manufacturing method can where appropriate be localized on part of the vessel.

The final vessel therefore comprises a structure incorporating an intermediate second layer 3 consisting of a material having variable permeability properties depending on the temperature, sandwiched between two layers 2, 4, a first polyolefin resin-based layer 2 and a third layer 4 based on a different resin from the first layer 2, respectively, the second layer 3 being impregnated with the resins from the other two layers.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A method for manufacturing a composite pressurized-fluid vessel comprising:
  winding a first polyolefin resin-based tape thereby forming a first layer of the vessel,
  depositing an intermediate second layer on the first layer, consisting of a material having variable permeability properties depending on the temperature and permeability below a pre-determined temperature threshold and non-permeability above the temperature threshold,
  winding a second resin-based tape on the intermediate second layer thereby forming a third layer, and
  cooling the intermediate second layer to a temperature below the temperature threshold while the first and third layers are each kept at a temperature above the melting temperature of their resin, wherein the tape forming the third layer is based on a different resin from the first layer and wherein, during the step of depositing the intermediate second layer and during the step of winding the second tape, the intermediate second layer is kept at a temperature above the temperature threshold.

2. The method as claimed in claim 1, wherein the first polyolefin resin-based tape contains reinforcing fibers such as glass and/or carbon fibers.

3. The method as claimed in claim 1, wherein the intermediate second layer has a thickness smaller than the thickness of the first layer.

4. The method as claimed in claim 1, wherein the tape forming the third layer is based on a thermoplastic resin.

5. The method as claimed in claim 1, wherein the tape forming the third layer is based on a resin comprising at least one of the following materials: PET, PBT and PA.

6. The method as claimed in claim 1, wherein the melting temperatures of the resins of the first and third layers are within a 40° C. temperature range.

7. The method as claimed in claim 1, wherein the melting temperature of the resin of the third layer is above the melting temperature of the first layer.

8. The method as claimed in claim 1, wherein the intermediate second layer comprises or consists of a fleece.

9. The method as claimed in claim 1, wherein the intermediate second layer consists of at least one of the following materials: polyester, polyamide or a combination thereof.

10. The method as claimed in claim 1, wherein the intermediate second layer consists of a material having a weight per unit area of between 50 and 800 grammes per $m^2$.

11. The method as claimed in claim 1, wherein the first layer of the vessel forms the sealed liner intended to be in contact with the fluid to be stored in the vessel or is situated on the outer surface of a sealed liner intended to be in contact with the fluid to be stored in the vessel.

* * * * *